(12) United States Patent
Lebowsky et al.

(10) Patent No.: US 6,388,969 B1
(45) Date of Patent: May 14, 2002

(54) DEVICE FOR CALCULATING THE MUTUAL PHASE SHIFT OF TWO SAMPLED INCIDENT SIGNALS

(75) Inventors: Fritz Lebowsky, Corps D'Uriage; Sonia Marrec, Meylan; Rabah Chelal, Grenoble, all of (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/698,324

(22) Filed: Oct. 27, 2000

(30) Foreign Application Priority Data

Oct. 28, 1999 (FR) .............................. 99 13524

(51) Int. Cl.$^7$ ................................ G11B 7/00
(52) U.S. Cl. .............. 369/59.1; 369/59.12; 369/124.01; 369/44.34
(58) Field of Search ....................... 369/47.1, 47.11, 369/47.15, 47.25, 47.28, 47.32, 47.35, 47.48, 53.1, 53.34, 59.1, 59.11, 59.12, 59.17, 59.2, 59.21, 60.01, 124.01, 124.05, 124.14, 44.34

(56) References Cited

U.S. PATENT DOCUMENTS

| 4,845,574 A | | 7/1989 | Li et al. |
|---|---|---|---|
| 4,982,110 A | * | 1/1991 | Yokogawa et al. ...... 369/47.21 |
| 5,090,003 A | * | 2/1992 | Watanabe et al. ......... 369/44.34 |
| 5,541,960 A | * | 7/1996 | Satomura et al. .... 369/59.23 X |

FOREIGN PATENT DOCUMENTS

| EP | 0109837 A1 | 5/1984 |
|---|---|---|
| EP | 0138274 A1 | 4/1985 |
| EP | 0241974 A1 | 10/1987 |
| EP | 0430541 A2 | 6/1991 |
| WO | WO 98/47136 | 10/1998 |

OTHER PUBLICATIONS

European Patent Office, Patent Abstract of Japanese Publication No. 01255338, Dec. 10, 1989.
French Preliminary Search Report dated Oct. 17, 2000 for French Patent Application No. FR 9913524.

* cited by examiner

*Primary Examiner*—Muhammad Edun
(74) *Attorney, Agent, or Firm*—Lisa K. Jorgenson; Stephen Bongini; Fleit, Kain, Gibbons, Gutman & Bongini P.L.

(57) ABSTRACT

A device is provided for calculating mutual phase shift of first and second incident signals. The device includes a first pair of blocks associated with the first incident signal, a second pair of blocks associated with the second incident signal, checking circuit, and post-processing circuit. Each of the blocks has storage elements for storing a predetermined set of samples of the corresponding incident signal. In the presence of minimum samples or maximum samples of both incident signals, the checking circuit stores a first set of samples relating to the first incident signal in one of the blocks of the first pair and a first set of samples relating to the second incident signal in the counterpart block of the second pair, and then stores the following sets of samples of each incident signal alternately in the two blocks of each pair. The checking circuit delivers a block validation signal when a set of samples has been completely stored in the storage elements of one of the blocks. The post-processing circuit determines the phase shift of the first and second incident signals when two block validation signals are delivered for two counterpart blocks of the two pairs. Also provided is a digital disc reader that includes such a device.

23 Claims, 8 Drawing Sheets

DEVICE FOR CALCULATING THE MUTUAL PHASE SHIFT OF TWO SAMPLED INCIDENT SIGNALS

CROSS-REFERENCE TO RELATED APPLICATIONS

This application is based upon and claims priority from prior French Patent Application No. 99-13524, filed Oct. 28, 1999, the entire disclosure of which is herein incorporated by reference.

BACKGROUND OF THE INVENTION

1. Field of the Invention

The present invention relates to electronic circuits, and more specifically to an electronic device for calculating the mutual phase shift of two sampled incident signals.

2. Description of Related Art

Digital discs are commonly used to store large amounts of data for distribution. Current examples of optical digital discs include "compact discs" such as the CD-ROM (Read Only Memory Compact Disc) and multifunction digital discs such as the DVD (Digital Versatile Disc), which typically stores data (e.g., image data) in a compressed state. When reading from an optical digital disc, the phase shift between two sampled incident signals corresponds to the positioning error of the incident optical beam (e.g., laser spot) that is illuminating the track of the digital disc that is being read.

Conventional devices that read digital discs detect any phase shift between two sampled incident signals emanating from photodetectors to determine the positioning error of the incident optical beam. This positioning error is then used in a slaving loop to modify the incident optical system so as to bring the optical beam back to the track and slave it thereto. Conventionally, the determination of the mutual phase shift between two sampled incident signals requires the use of several memories of the "first-in, first-out" (FIFO) type to store a number of samples of the received signals in succession, and a relatively complex control system to make it possible to tag the time instants of appearance of the transitions.

SUMMARY OF THE INVENTION

In view of these drawbacks, it is an object of the present invention to overcome the above-mentioned drawbacks and to provide a simple device for calculating the mutual phase shift of two sampled incident signals.

Another embodiment of the present invention provides an electronic device for calculating the mutual phase shift of two sampled incident signals.

Yet another object of the present invention is to provide a digital disc reader having circuitry for calculating the mutual phase shift of two sampled incident signals.

One embodiment of the present invention provides a device for calculating mutual phase shift of first and second incident signals. The device includes a first pair of blocks associated with the first incident signal, a second pair of blocks associated with the second incident signal, checking means, and post-processing means. Each of the blocks has storage elements for storing a predetermined set of samples of the corresponding incident signal. In the presence of minimum samples or maximum samples of both incident signals, the checking means stores a first set of samples relating to the first incident signal in one of the blocks of the first pair and a first set of samples relating to the second incident signal in the counterpart block of the second pair, and then stores the following sets of samples of each incident signal alternately in the two blocks of each pair. The checking means delivers a block validation signal when a set of samples has been completely stored in the storage elements of one of the blocks. Further, the post-processing means determines the phase shift of the first and second incident signals when two block validation signals are delivered for two counterpart blocks of the two pairs, on the basis of the content of the two counterpart blocks. In a preferred embodiment, the predetermined set of samples includes at least one minimum sample, one maximum sample, and two intermediate samples that are representative of a transition of the incident signal with respect to a predetermined overstepping threshold.

Another embodiment of the present invention provides a digital disc reader that includes an optical head having a light emitter and a plurality of photodetectors, means for pairwise summing signals emanating from the photodetectors and outputting first and second sampled incident signals, and a device for calculating mutual phase shift of the first and second incident signals.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

The present invention provides electronic devices for calculating the mutual phase shift of two sampled incident signals. In one preferred embodiment, the device includes a detection stage that detects the transitions of each incident signal with respect to a predetermined overstepping threshold (for example, the value 0), and that also detects the "minimum" samples of this signal (i.e., samples whose levels are less than a predetermined low threshold) and the "maximum" samples (i.e., samples whose levels are greater than a predetermined high threshold).

The device also includes a first pair of blocks associated with a first incident signal and a second pair of blocks associated with a second incident signal. For example, the first block of each pair can be assigned to the "rising" movements of the corresponding incident signal, with the second block of each pair then associated with the "falling" movements. Each block includes storage elements (for example, a memory, memory elements, registers, or D flip-flops) that store the levels (amplitudes) of a predetermined set of samples of the corresponding incident signal. This predetermined set of samples includes at least one minimum sample, one maximum sample, and two intermediate samples representative of a transition of the incident signal that is situated temporally between the minimum and maximum samples.

Preferably, each set also includes a pair of additional intermediate samples, with the pair of intermediate samples is representative of the first detected transition of the corresponding incident signal and the pair of additional intermediate samples representative of the last detected transition of the incident signal, in the case of oscillations of the signal between the minimum and maximum samples. Each block also includes first, second, and third temporal counters that are regulated by the sampling clock signal and respectively associated with the minimum sample, the maximum sample, and one of the intermediate samples.

Additionally, the device for calculating the mutual phase shift of two sampled incident signals includes checking means that can be embodied in a logic circuit or in software running on a microcontroller or microprocessor. In the presence of two minimum samples or of two maximum samples relating to the two incident signals, the checking means stores the first set of samples relating to the first signal in one of the blocks of the first pair (for example, in the first block of the first pair if a minimum sample is present or in the second block of the first pair if a maximum sample is present) and the first set of samples relating to the second signal in the counterpart block of the second pair (for example, also in the first block of the second pair if a minimum sample is present with respect to the second signal, or also in the second block of the second pair if a maximum sample is present with respect to the second signal).

The checking means then stores the successive following sets of samples of each incident signal alternately and successively in the two blocks of each pair, beginning with the other block of each pair (for example, the second block of each pair if the first set of samples relating to each incident signal was stored in the first block). The checking means also initializes the temporal counter associated with the stored sample. For example, when the minimum sample is stored in the corresponding storage element of the block, the first temporal counter is initialized. When the second intermediate sample is detected and stored, the third temporal counter is initialized and then, when a maximum sample is detected and stored, the second temporal counter is initialized.

Further, the checking means delivers a "block validation" logic signal when the corresponding set of samples has been completely stored in the storage elements of the block. Stated otherwise, when all the storage elements are filled, a validation signal is sent. For example, this validation signal can be a logic signal that keeps the value 0 as long as the block is not filled and that takes the value 1 when all the samples of the set have been stored.

The device for calculating the mutual phase shift of two sampled incident signals also includes post-processing means that can also be embodied in a logic circuit or in software running on a microcontroller or microprocessor. The post-processing means determines the phase shift of the two incident signals when two block validation signals relating to two counterpart blocks of the two pairs are sent. Also, the post-processing means determines this phase shift at least on the basis of the values of the third temporal counters of these two blocks (i.e., the values of the counters associated with the intermediate or transition samples) and the levels of the intermediate samples stored in these two blocks. Stated otherwise, each time that two counterpart blocks are indicated as full (regardless of whether they are the first two or the second two of each pair), the phase shift is determined on the basis of the content of these blocks.

Preferably, the post-processing means has storage means (for example, registers). Then, in the presence of two block validation signals relating to two counterpart blocks of the two pairs, the checking means transfers the contents of the two counterpart blocks into the storage means, and then the post-processing means determines the phase shift on the basis of the content of the storage means. This makes it possible to calculate the phase shift in non-real time, independently of the storage cycle looped back in the blocks, because the values of the counters are frozen in the storage means of the post-processing means.

Preferably, the post-processing means also performs a check of the validity of the phase shift calculation by comparing the value of the first temporal counter of one of the blocks (i.e., the temporal counter value associated with the maximum sample) and the value of the second temporal counter of the other block (i.e., the temporal counter value associated with the minimum sample). For example, so as not to calculate the phase shift for signals which are too greatly out of phase (for example, in phase opposition) in the case of a rising configuration, it is expedient to ensure that the counter associated with the maximum sample of a signal remains less than the counter associated with the minimum sample of the other signal. In the case of a falling configuration, the temporal counter associated with the maximum sample of a signal must remain greater than the counter associated with the minimum sample of the other signal.

Further, so as to take into account oscillations of one or both of the incident signals between their minimum and maximum samples, it is preferable for each block to include two additional elementary storage elements for storing as appropriate a pair of additional intermediate samples that are representative of a final transition of the incident signal, which transition is situated between the minimum and maximum samples. The two intermediate samples are then representative of the first transition detected. In this case, each block also includes a fourth temporal counter associated with one of these additional intermediate samples.

To calculate the phase shift between the two incident signals in this case, the post-processing means uses either the value of the third temporal counter associated with the pair of intermediate samples (i.e., taking into account the initial transition), or the value of the fourth temporal counter associated with the pair of additional intermediate samples (i.e., taking into account the final transition). This is done as a function of the ratio between the difference between the values of the first temporal counters associated with the two counterpart blocks (i.e., the time gap between the two maximum samples of the two incident signals), and the difference between the values of the second temporal counters associated with the two counterpart blocks (i.e., the time gap between the two minimum samples).

This device for calculating the mutual phase shift of two sampled incident signals can be incorporated into a digital disc reader (e.g., a DVD disc reader) of the type that includes an optical head having means for emitting an incident light beam and several photodetectors for detecting the reflection of the light beam off the disc, and means for pairwise summing the signals from the photodetectors and delivering two sampled incident signals.

Although the present invention is not limited to such an implementation, a device for calculating phase shift according to one embodiment of the present invention will now be described in detail within the framework of a DVD disc reader.

Figure 1:
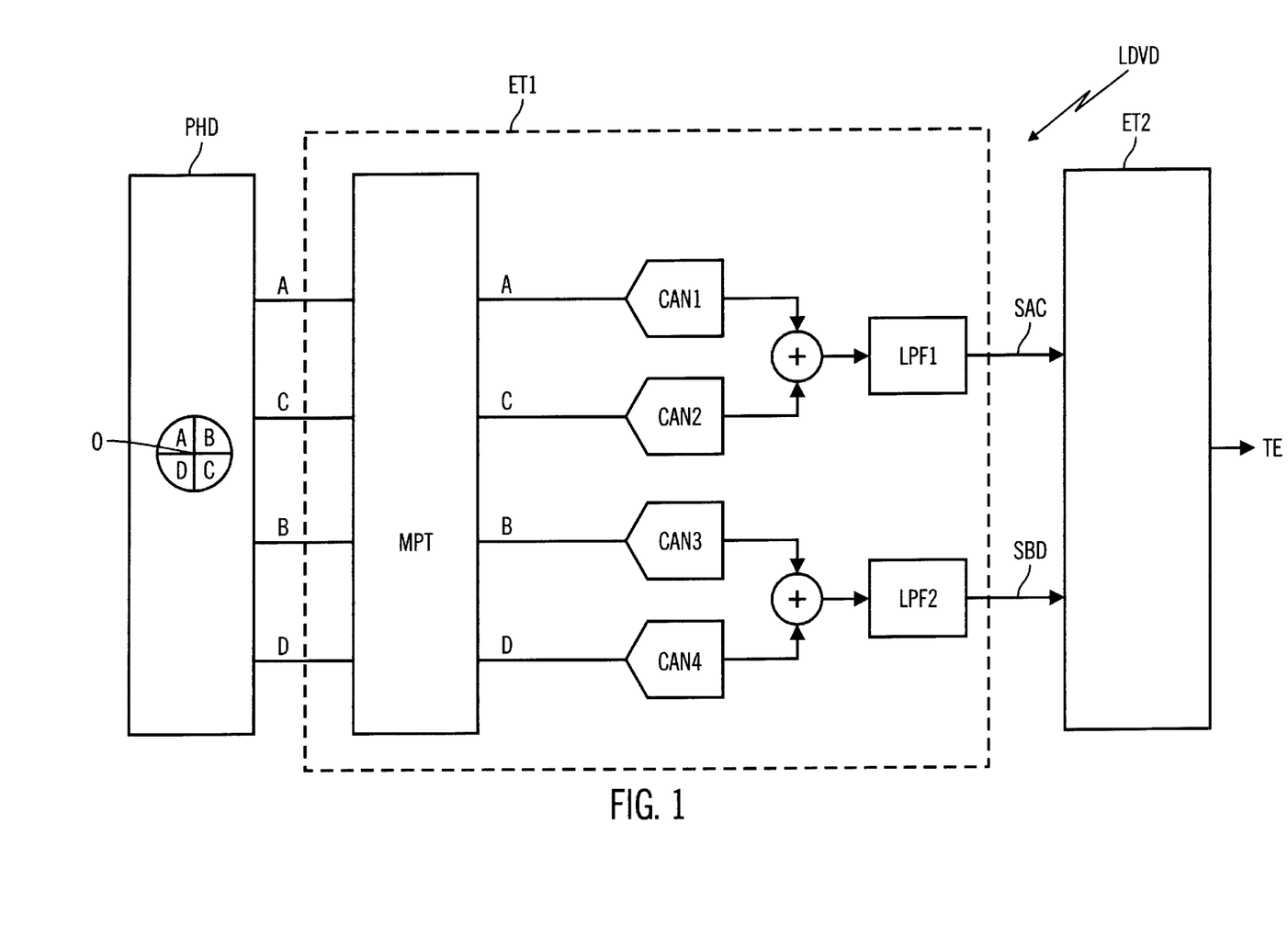
FIG. 1 is a block diagram illustrating a portion of the internal architecture of a digital disc reader.

FIG. 1 shows a portion of the internal architecture of a DVD disc reader. As shown, the disc reader LDVD includes an optical sensor PHD composed of four photodetectors A, B, C, and D. During operation, a laser diode emits a laser beam and a beam splitter and conventional optical system are used to direct the beam towards the face of a disc on which is etched a track containing information. The beam reflected by the disc then passes through the beam splitter in the opposite direction and is picked up by the four photodetectors A, B, C, and D, which are all situated in a plane parallel to the plane of the disc. Each photodetector delivers a signal (which for simplicity is labeled in FIG. 1 with the letter assigned to the corresponding photodetector).

These elementary signals A, B, C, and D are processed by a first processing stage ET1 that includes first a conventional preliminary processing module MPT having amplifiers. The signals A, C, B, and D output by the preliminary processing module MPT are thereafter sampled by four analog-to-digital converters CAN1–CAN4. In this embodiment, the sample clock signal CKE is delivered by a quartz crystal (not shown for the sake of simplification), and has a frequency of 120 MHz. Next, two adders sum the two elementary signals which emanate from the two photodetectors symmetric with respect to the top center of the sensor. More specifically, one of the secondary signals is equal to the sum of elementary signals A and C, and the other secondary signal is equal to the sum of elementary signals B and D.

Next, the summed signals are filtered in two identical low-pass filters LPF1 and LPF2. Thus, the first processing stage ET1 provides two sampled incident signals SAC and SBD whose mutual phase shift is representative of the positioning error of the optical beam with respect to the track of the disc. These two sampled signals SAC and SBD are delivered to a second processing stage ET2 that includes a device for calculating phase shift according to an embodiment of the present invention. The device processes the two sampled signals SAC and SBD and supplies a positioning error TE to a slaving loop. In a conventional manner, the slaving loop then modifies the incident optical system to bring the optical beam back to the track of the disc and slave it thereto.

In addition to the four elementary signals, the optical sensor formed by the photodetectors delivers an overall signal (or useful signal) that is equal to the sum of the four elementary signals. The binary information read from the track is extracted from the overall signal in a conventional manner. The overall signal and the conventional processing circuitry of the digital disc reader that extracts the coded data are not shown in FIG. 1 for the sake of simplicity.

Figure 2:
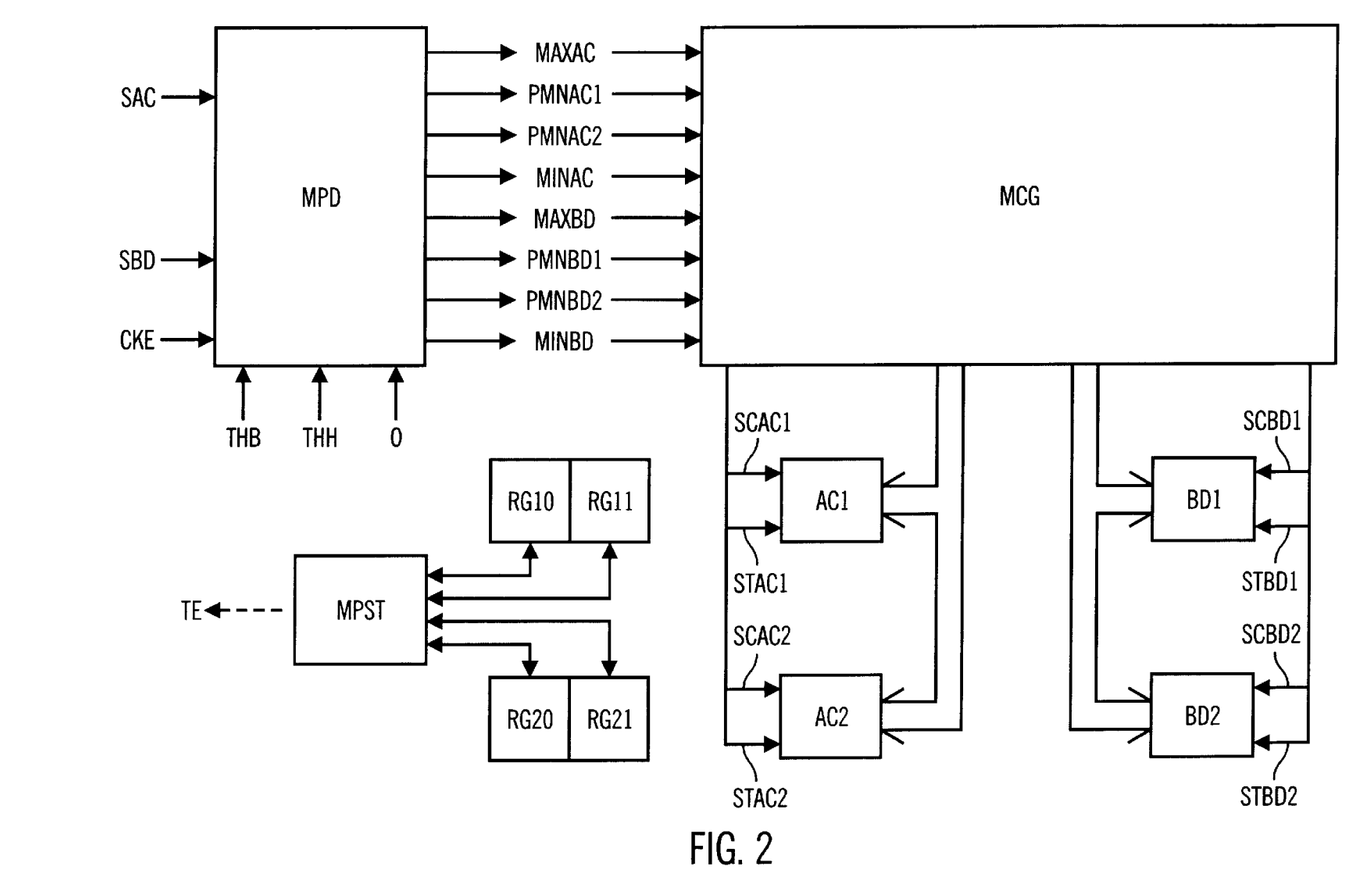
FIG. 2 is a block diagram illustrating a device for calculating phase shift according to an exemplary embodiment of the present invention that can be incorporated into the disc reader of FIG. 1.

FIG. 2 shows a device for calculating phase shift according to an exemplary embodiment the present invention. In this implementation, the device is incorporated into the DVD disc reader of FIG. 1. As shown, a detection stage MPD detects the transitions of each incident signal SAC and SBD with respect to a predetermined overstepping threshold SE (for example, the value 0). This detection stage detects the "minimum" samples of this signal (i.e., those whose levels are less than a predetermined low threshold THB) and the "maximum" samples (i.e., those whose levels are greater than a predetermined high threshold THH).

In this exemplary embodiment, the detection stage MPD includes comparators that compare each sample of an incident signal with the high and low thresholds THH and THB. The detection stage outputs a maximum sample MAXAC of signal SAC (i.e., a sample whose level is greater than the high threshold THH) and a minimum sample MINAC of signal SAC (i.e., a sample whose level is less than the low threshold THB). Moreover, so as to detect the transitions with respect to the overstepping threshold SE (taken equal to 0), the detection stage includes two registers in series which sequentially store two consecutive samples of the incident signal.

The detection stage detects a change of sign between the two stored samples as being representative of a transition. In this case, the two samples representative of the transition are made "intermediate samples" PMNAC1 and PMNAC2 with respect to signal SAC. What has just been described with respect to signal SAC applies in the same manner to signal SBD. More precisely, the detection stage outputs a maximum sample MAXBD of signal SBD, a minimum sample MINBD of signal SBD, and two intermediate samples PMNBD1 and PMNBD2 representative of a transition of signal SBD with respect to the overstepping threshold SE (equal to 0).

The various samples output by the detection stage are delivered to checking means MCG. The operation of the checking means is described in greater detail below, but in general it controls two pairs of blocks dedicated to the two incident signals SAC and SBD. More precisely, the first pair of blocks formed by the first block AC1 and the second block AC2 is dedicated to signal SAC, and the second pair of blocks formed by the first block BD1 and of the second block BD2 is dedicated to the second incident signal SBD.

One of the blocks of each pair is dedicated to the rising movements of the corresponding signal, and the other block of the pair is linked to the falling movements of the corresponding signal. A rising movement of a signal is manifested from the appearance of a minimum sample of the signal until a maximum sample is obtained for the same signal, after having obtained one or even several transitions of the signal that are situated temporally between the minimum and maximum samples. Likewise, a falling movement of a signal is manifested from the appearance of a maximum sample of the signal until a minimum sample of the signal is obtained, after having obtained one or even several transitions of the signal that are temporally situated between the maximum and minimum samples.

In accordance with the present invention, two blocks each situated in one of the two pairs of blocks are said to be "counterpart" if they are both dedicated to the same configuration of the signal (i.e., either both to the rising configuration of the corresponding signal or to the falling configuration of the corresponding signal). More precisely, in the example described below, it is assumed that the first block AC1 of the first pair is dedicated to the rising configurations of signal SAC, and the second block AC2 of this first pair is dedicated to the falling configurations of signal SAC. Likewise, it is assumed that the first block BD1 of the second pair is dedicated to the rising configurations of signal SBD, and the second block BD2 of this second pair is dedicated to the falling configurations of signal SBD. Consequently, blocks AC1 and BD1 are said to be counterparts, and blocks AC2 and BD2 are said to be counterparts.

Figure 4:
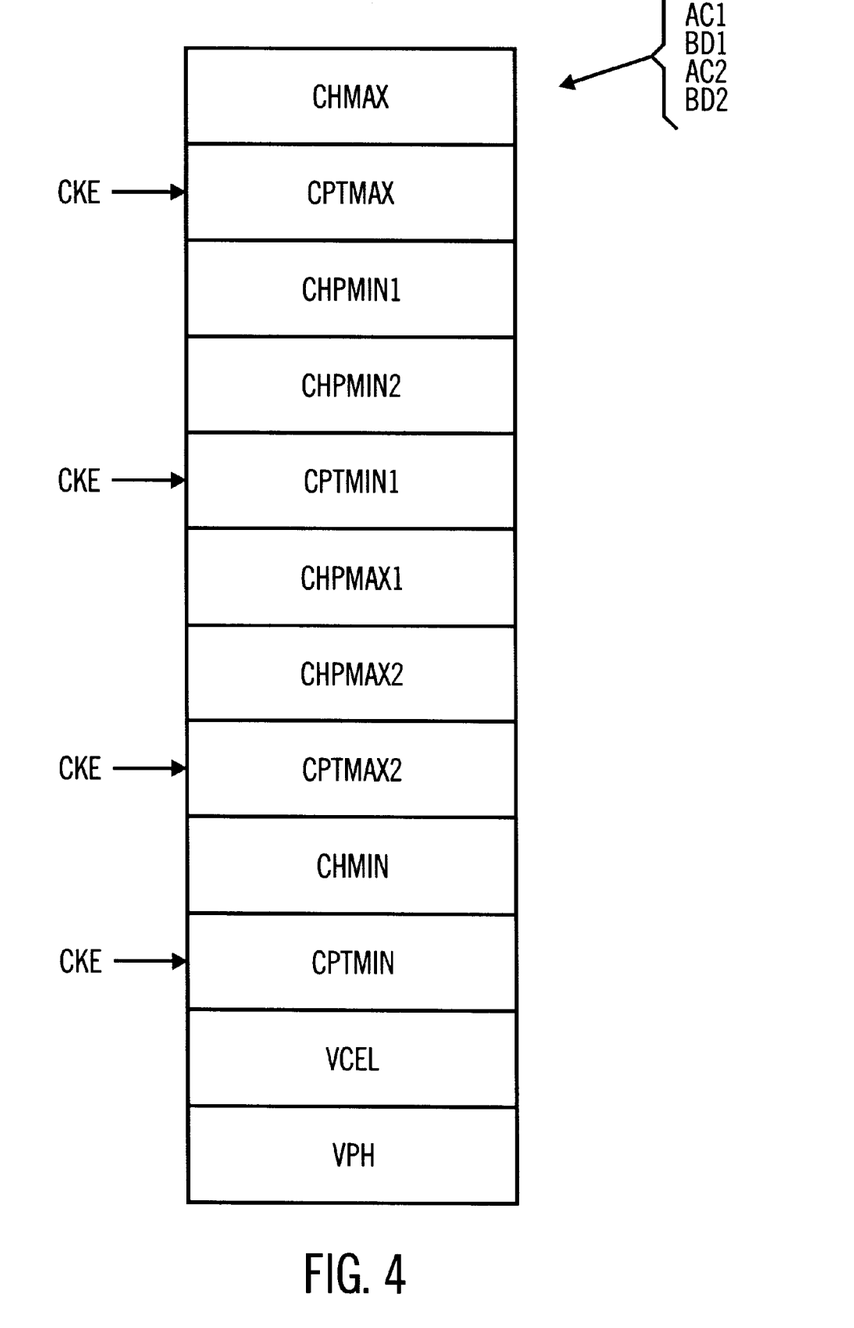
FIG. 4 illustrates in more detail the internal architecture of a block used in the device for calculating phase shift of FIG. 2.

As illustrated in FIG. 4, each block AC1, BD1, AC2, or BD2 includes a storage cell and temporal counters that are regulated by the clock signal CKE (i.e., that increment by one unit with each rising edge of the clock signal CKE). The storage cell includes various memory fields (or storage elements) CHMIN, CHMAX, CHPMIN1, CHPMIN2, CHPMAX1, and CHPMAX2. Storage element CHMIN stores any minimum sample of the corresponding signal, and storage element CHMAX stores any maximum sample of the corresponding incident signal. Storage elements CHPMIN1 and CHPMIN2 respectively store the two intermediate samples of the incident signal which are representative of the first detected transition which follows the appearance of a minimum sample in the case of a rising configuration of the signal, or the appearance of a maximum sample in the case of a falling configuration of the signal.

Storage elements CHPMAX1 and CHPMAX2 respectively store two additional intermediate samples respectively representative of the last transition and the final transition detected and situated between the minimum and maximum samples of the corresponding signal. The samples stored in storage elements CHPMAX1 and CHPMAX2 are used only when the corresponding signal exhibits an oscillation on either side of the overstepping threshold (as will be seen in greater detail below). Each block also includes a storage element VPH for storing a logic signal VPH which takes one value (for example, 0) in the absence of additional intermediate samples stored in fields CHPMAX1 and CHPMAX2 and which takes another value (for example, 1) in the presence of such additional intermediate samples.

The samples stored in the storage elements CHMAX, CHPMIN1, CHPMIN2 and CHMIN constitute a predetermined set of samples. The block of FIG. 4 also includes an additional storage element VCEL for storing a logic signal VCEL which takes one value (for example, 0) as long as this set of samples has not been completely stored in the storage elements of the block. Conversely, as soon as this set of samples has been stored, the signal VCEL takes another value (for example, 1). The block is then said to be validated, with the signal VCEL being a block validation signal when it is active (has the latter value of 1). The block validation signal VCEL become active without having additional intermediate samples. Nevertheless, in the presence of an oscillation of the incident signal, the activation of the validation signal VCEL implicitly signifies that additional intermediate samples have been stored in the storage elements CHPMAX1 and CHPMAX2.

With the storage cell, there are associated four temporal counters CPTMIN, CPTMAX, CPTMIN1, and CPTMAX2. The first temporal counter CPTMIN is initialized to an initial value (for example, 0) each time a minimum sample is stored in storage element CHMIN. Likewise, the second temporal counter CPTMAX is reinitialized (for example, to 0) each time a maximum sample is stored in storage element CHMAX. Analogously, the third temporal counter CPTMIN1 is initialized in the presence of the storage of one of the intermediate samples in the corresponding storage element.

Thus, the initialization of this third temporal counter CPTMIN1, which is associated with one of the intermediate samples, is representative of the appearance of a transition.

Likewise, the fourth temporal counter CPTMAX2, which is associated with one of the additional intermediate samples stored in one of the storage elements CHPMAX1 or CHPMAX2, is initialized upon the storage of this additional intermediate sample and is representative of the appearance of the final transition of the signal. The checking of each block AC1, BD1, AC2, and BD2 (i.e., the writing to the storage elements and the activation of the logic signals) is performed by checking signals SCAC1, SCBD1, SCAC2, and SCBD2, as shown in FIG. 2.

Figure 3:
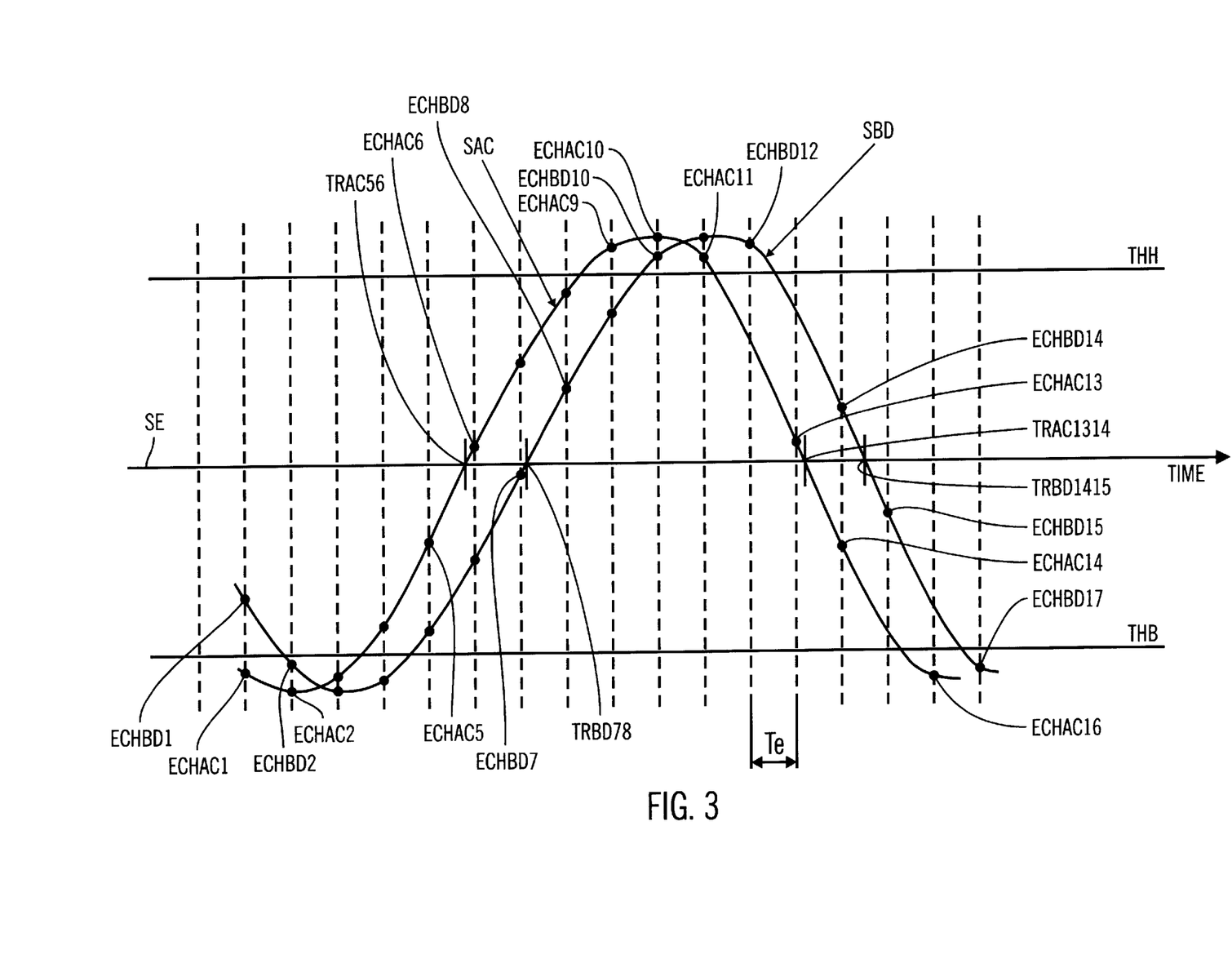
FIG. 3 is a graph illustrating two sampled incident signals processed by the device for calculating phase shift of FIG. 2.
Figure 5:
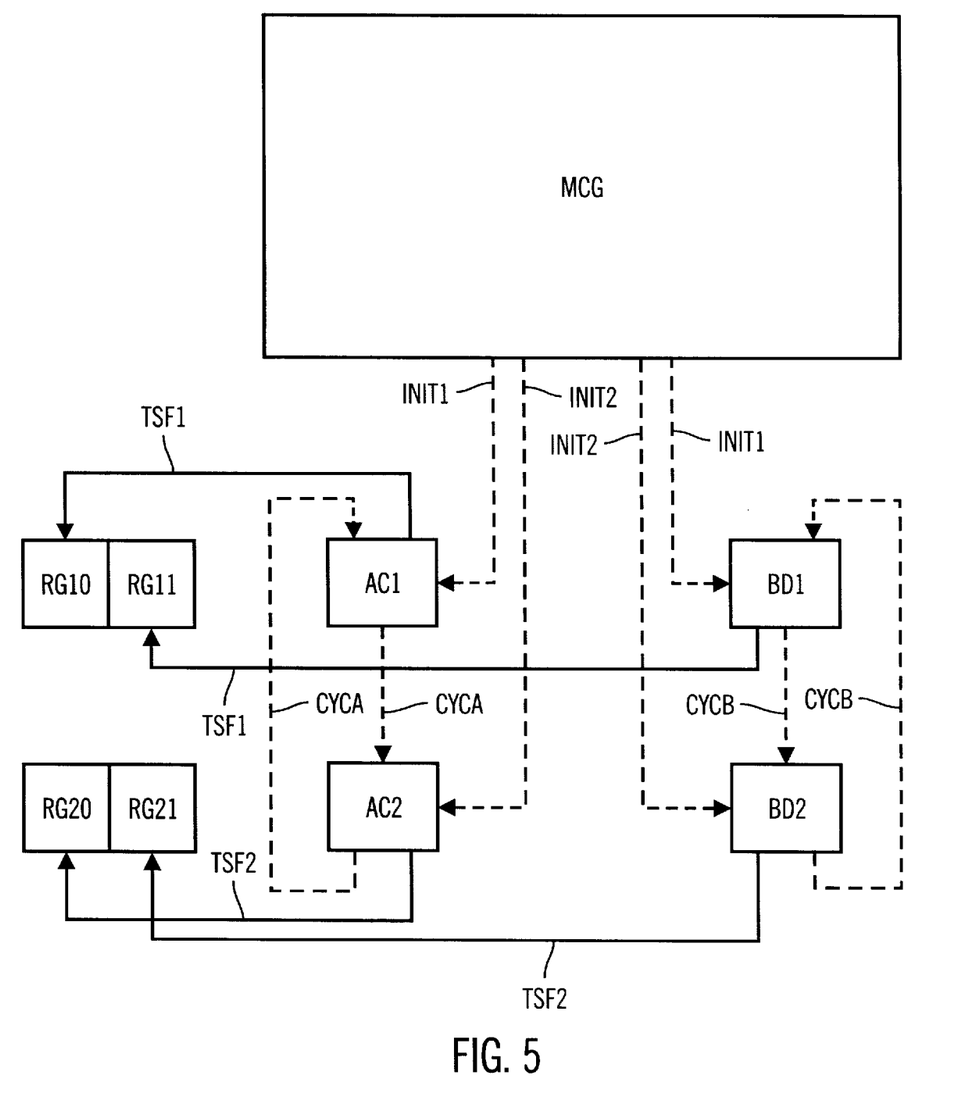
FIG. 5 illustrates a mode of operation of the device for calculating phase shift of FIG. 2.

The operation of the device for calculating phase shift of this exemplary embodiment will now be described in greater detail with reference to FIGS. 2, 3, and 5. In the example of FIG. 3, the signals SAC and SBD are mutually out of phase. Moreover, in this Figure, the dashed vertical lines spaced apart by the sampling period Te represent the various rising edges of the clock signal CKE to designate when the samples of the two signals SAC and SBD arrive. In general, in accordance with the present invention, the checking means MCG initializes the storage of the samples in the storage elements of the corresponding blocks only in the presence of either two minimum samples or two maximum samples for the two incident signals.

More particularly, as illustrated in FIG. 3, sample ECHAC1 of signal SAC is detected as being a minimum sample. At the same instant, sample ECHBD1 of signal SBD is not detected as being a minimum sample. Consequently, there is no initialization of storage in the blocks. Conversely, upon the rising edge of the clock signal, the detection stage MPD detects a minimum sample for signal SBD (i.e., sample ECHBD2) and a minimum sample for signal SAC (i.e., sample ECHAC2). Consequently, the checking means MCG initializes the storage of the set of samples for each incident signal in blocks AC1 and BD1, as illustrated by dashed arrows INIT1 in FIG. 5, because these blocks AC1 and BD1 are dedicated to the rising configurations of the signals. If two maximum samples had been present for the two signals, the checking means MCG would have initialized the storage in blocks AC2 and BD2, which are dedicated to the falling configurations of the signals, as illustrated by dashed arrows INIT2 in FIG. 5.

In parallel with the storage of these minimum samples, counters CPTMIN are initialized to 0 by the checking means MCG. Upon the next rising edge, two new minimum samples for the two signals are detected. These two minimum samples are in turn stored in storage elements CHMIN of blocks AC1 and BD1 so as to overwrite the old values of the minimum samples that were previously stored. Likewise, counters CPTMIN are again reinitialized to 0. Upon the next rising edge of the clock, signal SAC oversteps the low threshold THB. Therefore, there is no longer any minimum sample detected. Conversely, there is again a minimum sample detected for signal SBD, which is stored in storage element CHMIN of block BD1 and counter CPTMIN is again initialized to 0. Upon the next rising edge of the clock, there is no longer any minimum sample detected for signal SBD.

Upon the sixth rising edge of the clock (with the first rising edge being the rising edge associated with samples ECHAC1 and ECHBD1), the detection stage MPD detects a change of sign of sample ECHAC6 with respect to the previous sample ECHAC5. These two samples are therefore regarded as two intermediate samples that are representative of a transition of signal SAC (i.e., transition TRAC56). Therefore, these two samples ECHAC5 and ECHAC6 are stored in storage elements CHPMIN1 and CHPMIN2 of block AC1. In parallel with this (e.g., upon the storage of sample ECHAC6), counter CPTMIN1 is initialized to 0. In a similar manner, the intermediate samples ECHBD7 and ECHBD8 are representative of the transition TRBD78 of signal SBD. Therefore, they are stored in storage elements CHPMIN1 and CHPMIN2 of block BD1. In parallel with this, counter CPTMIN1 of block BD1 is initialized to 0 (e.g., upon the storage of sample ECHBD8).

Upon the ninth rising edge of the clock signal, a maximum sample ECHAC9 is detected for signal SAC. This maximum sample is stored in storage element CHMAX of block AC1, and counter CPTMAX of block AC1 is in turn initialized to 0. At this instance, the block validation signal VCEL goes to the value 1 because the storage cell of block AC1 has stored at least one minimum sample, one maximum sample, and two intermediate samples that are representative of a transition. Conversely, upon this ninth rising edge of the clock signal, the validation signal VCEL of block BD1 is still at 0.

In the example of FIG. 3, the maximum sample ECHAC9 for incident signal SAC is followed by two other maximum samples ECHAC10 and ECHAC11. However, in other cases, the sample following the maximum sample ECHAC9 could be a sample that is situated below the high threshold THH. Further, in order to allow block AC2 to still store a maximum sample, it is preferable in certain applications, to duplicate the value contained in storage element CHMAX of block AC1 in storage element CHMAX of block AC2 when signal VCEL of block AC1 goes to 1.

The storage of the next set of samples relating to signal SAC is then continued in a similar manner in the storage elements of block AC2. In the present case, it is the sample ECHAC11 which will finally be stored as the maximum sample in the storage element CHMAX and cause the initialization of counter CPTMAX. The intermediate samples ECHAC13 and ECHAC14 that are representative of the transition TRAC1314 are stored in storage elements CHPMIN1 and CHPMIN2, and the minimum sample ECHAC16 is stored in storage element CHMIN. The next set of samples, which is representative of another rising configuration of signal SAC, is in turn stored in block AC1, as shown by storage cycle CYCA illustrated in FIG. 5.

Return to the tenth rising edge of the clock signal, there is storage of the maximum sample ECHBD10 of signal SBD in storage element CHMAX of block BD1. This causes the rising of the validation signal VCEL associated with block BD1 to 1. Because at this moment the two blocks are validated, the checking means then delivers transfer signals STAC1, STBD1 (FIG. 2) to the two counterpart blocks AC1 and BD1, respectively. In response, the blocks transfer the contents of block AC1 into register RG10 and the contents of block BD1 into register RG11 (as shown by arrows TSF1 in FIG. 5).

The storage cycle for signal SBD is continued in block BD2 in a manner similar to that for block AC2. More precisely, samples ECHBD12, ECHBD14, ECHBD15, and ECHBD17 are respectively stored in storage elements CHMAX, CHPMIN1, CHPMIN2, and CHMIN of block BD2. The two samples ECHBD14 and ECHBD15 are representative of the transition TRBD1415. Thus, storage cycle CYCB (FIG. 5) for blocks BD1 and BD2 is continued in a manner completely independent of storage cycle CYCA for blocks AC1 and AC2. Moreover, in a manner similar to transfer TSF1 (FIG. 5) which is performed between blocks AC1 and BD1 and registers RG10 and RG11 when the two blocks AC1 and BD1 are validated (signals VCEL equal to 1 for these two blocks), there is also a transfer TSF2 of blocks AC2 and BD2 into registers RG20 and RG21 when the two blocks AC2 and BD2 are validated (signals VCEL equal to 1).

Next, post-processing means MPST determines the mutual phase shift between the two signals SAC and SBD on the basis of the contents of registers RG10 and RG11 for the "rising" transitions, and on the basis of the contents of registers RG20 and RG21 for the "falling" transitions. Returning to the case illustrated in FIG. 3, if it is assumed that samples ECHAC5 and ECHAC6 and the corresponding value (frozen during the transfer) of temporal counter CPTMIN1 have been stored in register RG10, and that samples ECHBD7 and ECHBD8 and the value (frozen during the transfer) of counter CPTMIN1 of block BD1 have been stored in register RG11, the post-processing means determines the time gap of transition TRAC56, such as by linear interpolation with respect to the fifth rising edge of the clock signal.

The post-processing means also determines the time gap of transition TRBD78, such as by linear interpolation on the basis of the values of samples ECHBD7 and ECHBD8 with respect to the seventh rising edge of the clock signal. The time gap between the transitions TRAC56 and TRBD78 (i.e., the mutual phase shift of the two signals) can then easily be determined from the knowledge of the value of the sampling period Te. Preferably, the various calculated values of the time gaps are delivered to a conventional interpolating filter to make it possible to deliver phase shift values representative of the positioning error TE in a regular manner. Advantageously, the determination of the phase shift can be performed in non-real time with respect to the cycle of storage in the blocks, because the values of the counters have been frozen during the transfers into the registers.

In preferred embodiments, the post-processing means also checks the validity of the phase shift calculation by comparing the values of counter CPTMAX associated with one of the signals with the value of counter CPTMIN associated with the other signal. More precisely, with regard to the rising configurations of the two signals SAC and SBD in FIG. 3, the value of counter CPTMAX of block AC1 associated with signal SAC must be less than the value of counter CPTMIN of block BD1 associated with signal SBD. In the case of a falling configuration, counter CPTMAX relating to signal SAC must be greater than counter CPTMIN relating to signal SBD. Non-satisfaction of these inequalities would signify the presence of too considerable a phase shift of the signals (for example, of the signals in phase opposition) that could lead to errors in the calculation of the phase shifts.

Figure 6:
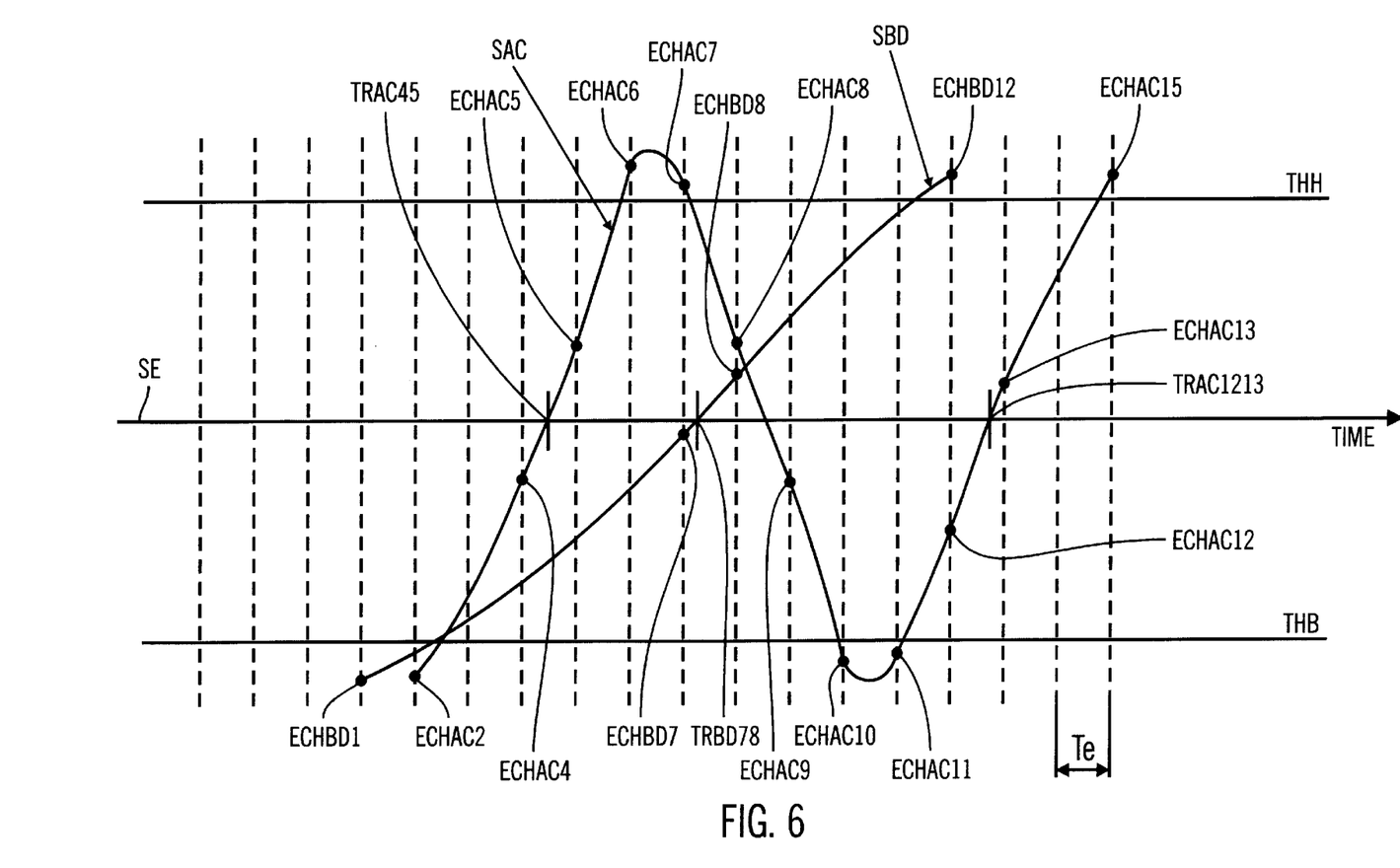
FIGS. 6 through 8 are graphs illustrating various possible cases of sampled incident signals that are processed by the device for calculating phase shift.

Furthermore, the combination of the initialization of the storage as described above and the authorization to calculate the phase shift solely in the presence of two counterpart block validation signals makes it possible to take into account movements of signals such as those illustrated in FIG. 6. In the example of FIG. 6, samples ECHAC2, ECHAC4, ECHAC5, and ECHAC6 are stored in block AC1. In parallel with this, samples ECHBD1, ECHBD7, ECHBD8, and ECHBD12 are stored in block BD1. However, in view of the movement of signal SAC, block AC1 will be validated before block BD1 upon the appearance of sample ECHAC6. However, because block BD1 will not be validated at this instant, there will be no calculation of the phase shift on the basis of the content of the two blocks AC1 and BD1.

The storage cycle for the signal SAC will then be continued in block AC2 (i.e., the corresponding storage elements of this block will receive samples ECHAC7, ECHAC8, ECHAC9, and ECHAC10). Upon the appearance of sample ECHAC10, block BD1 will still not be validated. The next rising configuration of signal SAC (samples ECHAC11, ECHAC12, ECHAC13, and ECHAC15) will be stored in block AC1. Only upon the appearance of sample ECHAC15 will there be the presence of two validated counterpart blocks (i.e., blocks BD1 and AC1). Therefore, the calculation of the phase shift between the two signals will be performed on the basis of the content of these two blocks (i.e., on the basis of transitions TRBD78 and TRAC1213, and not on the basis of transitions TRAC45 and TRBD78.

Figure 7:
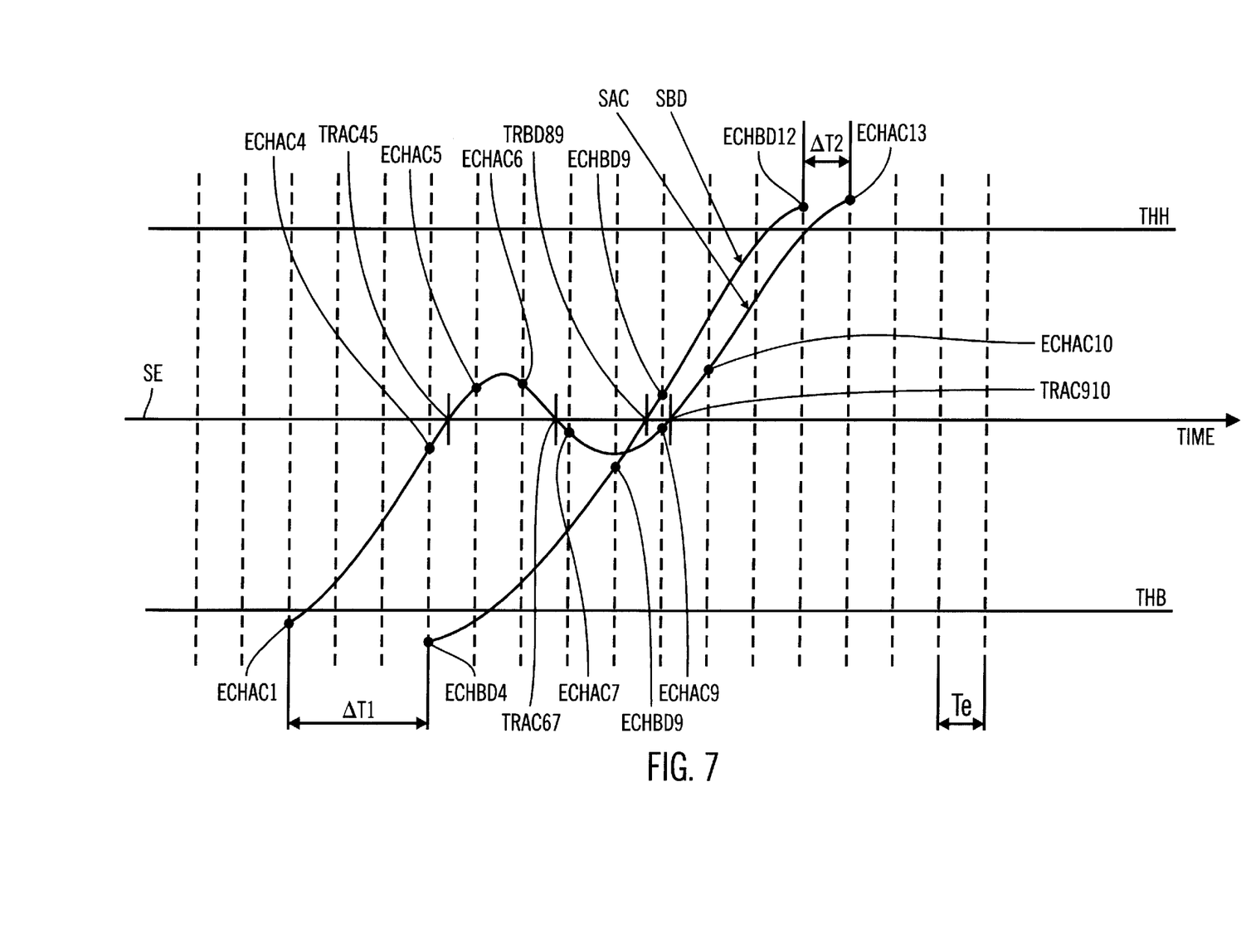
Figure 8:
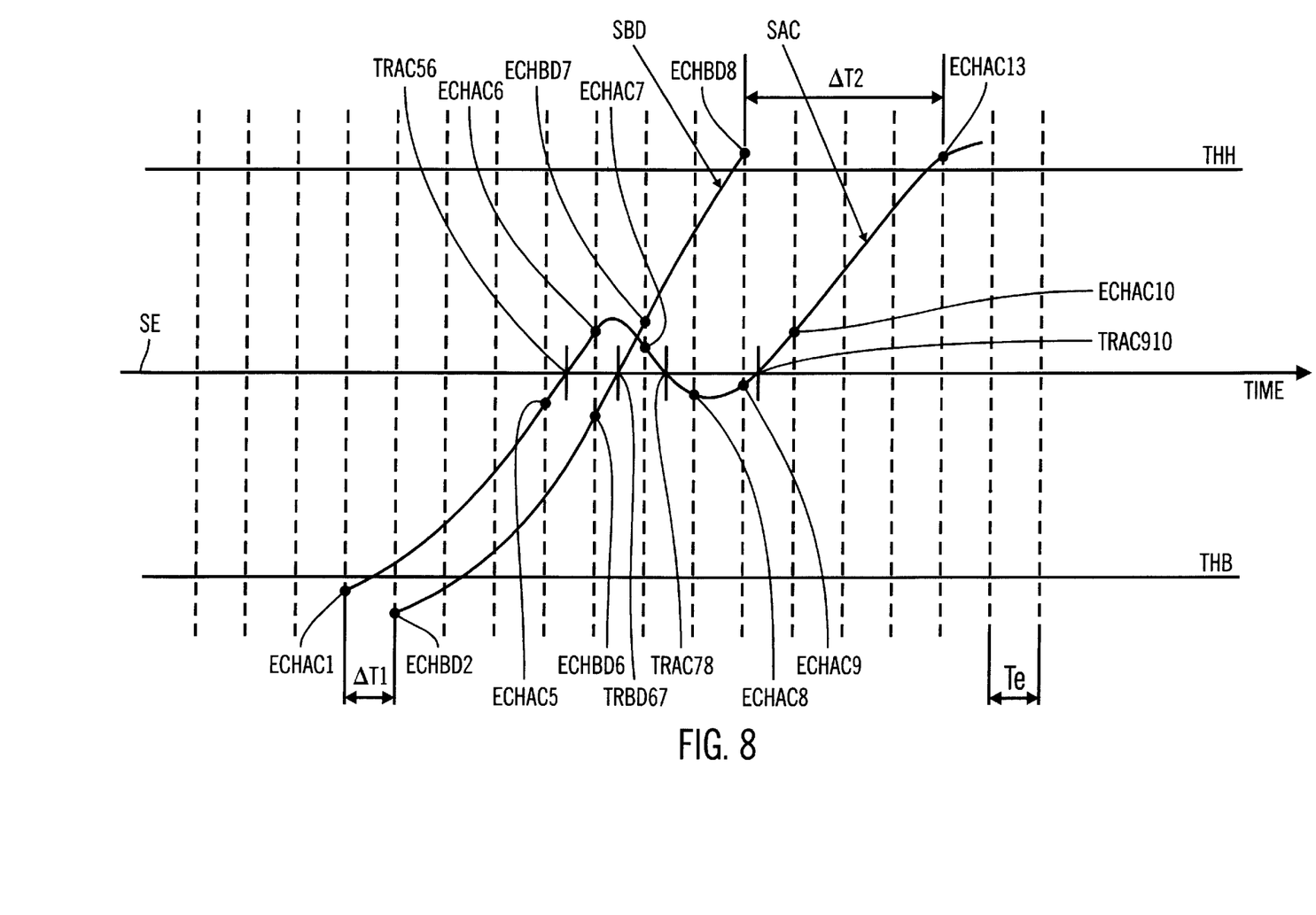

In accordance with the present invention, the calculating device also makes it possible to take into account oscillations of one or both of the incident signals between the low and high thresholds, as illustrated in FIGS. 7 and 8. In the example of FIG. 7, signal SAC undergoes an oscillation about the threshold SE between samples ECHAC1 and ECHAC13. The intermediate samples ECHAC4 and ECHAC5 are stored in storage elements CHPMIN1 and CHPMIN2. The additional intermediate samples ECHAC6 and ECHAC7 that are representative of an additional transition are stored in storage elements CHPMAX1 and CHPMAX2, and the counter CPTMAX2 is initialized (for example, upon the storage of the additional intermediate sample ECHAC7).

Upon the appearance of the last transition TRAC910 of signal SAC as represented by the additional intermediate samples ECHAC9 and ECHAC10, these additional intermediate samples ECHAC9 and ECHAC10 are in turn stored in storage elements CHPMAX1 and CHPMAX2, and again cause the initialization of counter CPTMAX2. In parallel with this, the storage of the set of samples of signal SBD is performed in block BD1. Upon the appearance of sample ECHAC13, the two blocks AC1 and BD1 are declared valid. There is a transfer into registers RG10 and RG11. The post-processing means MPST will then note that signal VPH is 1, which indicates the presence of an initial transition TRAC45 and a final transition TRAC910 for signal SAC.

In this case, the post-processing means will select from these two transitions, the one which will be used for calculating the phase shift (in combination with transition TRBD89 of signal SBD) as a function of a selection criterion which is the ratio $\Delta T2/\Delta T1$ between the difference of counters CPTMAX of the two blocks and the difference of counters CPTMIN of the two blocks. For example, if $\Delta T2/\Delta T1$ is less than 2/3 in one embodiment, the post-processing means MPST will use transition TRAC910. Conversely, if this ratio is greater than 3/2, as illustrated in the example FIG. 8, the post-processing means will use transition TRAC56 of signal SAC, and not transition TRAC910, for calculating the phase shift (with transition TRBD67 of signal SBD).

The device of the present invention is particularly suited for use with optical digital discs such as CDs and DVDs. However, the present invention is not so limited and can easily be adapted by one of ordinary skill in the art to calculate the phase shift between two signals in other applications.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A device for calculating mutual phase shift of first and second incident signals, said device comprising:

a first pair of blocks associated with the first incident signal and a second pair of blocks associated with the second incident signal, each of the blocks including storage elements for storing a predetermined set of samples of the corresponding incident signal;

checking means for, in the presence of minimum samples or maximum samples of both incident signals, storing a first set of samples relating to the first incident signal in one of the blocks of the first pair and a first set of samples relating to the second incident signal in the counterpart block of the second pair, and for then storing the following sets of samples of each incident signal alternately in the two blocks of each pair, beginning with the other block of each pair, the checking means delivering a block validation signal when a set of samples has been completely stored in the storage elements of one of the blocks; and post-processing means for determining the phase shift of the first and second incident signals when two block validation signals are delivered for two counterpart blocks of the two pairs, on the basis of the content of the two counterpart blocks, wherein a minimum sample is less than a low threshold and a maximum sample is greater than a high threshold.

2. The device as defined in claim 1, further comprising a detection stage that detects the minimum and maximum samples of each incident signal, and transitions of each incident signal with respect to a predetermined overstepping threshold.

3. The device as defined in claim 1, wherein the predetermined set of samples includes at least one minimum sample, one maximum sample, and two intermediate samples that are representative of a transition of the incident signal with respect to a predetermined overstepping threshold, the transition being temporally situated between the minimum and maximum samples.

4. The device as defined in claim 3, wherein each block also includes first, second, and third temporal counters that are regulated by a sampling clock signal and associated with the minimum sample, the maximum sample, and one of the intermediate samples, respectively.

5. The device as defined in claim 4, wherein in the presence of minimum samples or maximum samples of both incident signals, the checking means also initializes the temporal counter associated with the stored sample, and the post-processing means determines the phase shift of the first and second incident signals based on at least the values of the third temporal counters of the two counterpart blocks and the levels of the intermediate samples stored in the two counterpart blocks.

6. The device as defined in claim 4, wherein the post-processing means performs a validity check that includes a comparison between the value of the first temporal counter of one of the blocks and the value of the second temporal counter of the other of the blocks.

7. The device as defined in claim 4,
wherein the two intermediate samples of each set are representative of a first transition appearing between the minimum and maximum samples of the set, and
each block further includes two additional storage elements for selectively storing a pair of additional intermediate samples representative of a final transition of the incident signal, the final transition being situated between the minimum and maximum samples.

8. The device as defined in claim 7,
wherein each block further includes a fourth temporal counter that is associated with one of the additional intermediate samples, and
the post-processing means calculates the phase shift between the two incident signals using either the value of the third temporal counter associated with the pair of intermediate samples or the value of the fourth temporal counter associated with the pair of additional intermediate samples, based on the ratio between a difference between the values of the first temporal counters associated with the two counterpart blocks, and a difference between the values of the second temporal counters associated with the two counterpart blocks.

9. The device as defined in claim 1,
wherein the post-processing means includes storage means,
when two block validation signals are delivered for two counterpart blocks of the two pairs, the checking means transfers contents of the two counterpart blocks into the storage means, and
the post-processing means determines the phase shift based on contents of the storage means.

10. A digital disc reader comprising:
an optical head that includes a light emitter for emitting an incident light beam, and a plurality of photodetectors for detecting reflection of the light beam off a disc;
means for pairwise summing signals emanating from the photodetectors and outputting first and second sampled incident signals; and
a device for calculating mutual phase shift of the first and second incident signals, the device including:
a first pair of blocks associated with the first incident signal and a second pair of blocks associated with the second incident signal, each of the blocks including storage elements for storing a predetermined set of samples of the corresponding incident signal;
checking means for, in the presence of minimum samples or maximum samples of both incident signals, storing a first set of samples relating to the first incident signal in one of the blocks of the first pair and a first set of samples relating to the second incident signal in the counterpart block of the second pair, and for then storing the following sets of samples of each incident signal alternately in the two blocks of each pair, beginning with the other block of each pair, the checking means delivering a block validation signal when a set of samples has been completely stored in the storage elements of one of the blocks; and
post-processing means for determining the phase shift of the first and second incident signals when two block validation signals are delivered for two counterpart blocks of the two pairs, on the basis of the content of the two counterpart blocks,
wherein a minimum sample is less than a low threshold and a maximum sample is greater than a high threshold.

11. The digital disc reader as defined in claim 10, wherein the device for calculating mutual phase shift further includes a detection stage that detects the minimum and maximum samples of each incident signal, and transitions of each incident signal with respect to a predetermined overstepping threshold.

12. The digital disc reader as defined in claim 10, wherein the predetermined set of samples includes at least one minimum sample, one maximum sample, and two intermediate samples that are representative of a transition of the incident signal with respect to a predetermined overstepping threshold, the transition being temporally situated between the minimum and maximum samples.

13. The digital disc reader as defined in claim 12, wherein each block also includes first, second, and third temporal counters that are regulated by a sampling clock signal and associated with the minimum sample, the maximum sample, and one of the intermediate samples, respectively.

14. The digital disc reader as defined in claim 13,
wherein in the presence of minimum samples or maximum samples of both incident signals, the checking means also initializes the temporal counter associated with the stored sample, and
the post-processing means determines the phase shift of the first and second incident signals based on at least the values of the third temporal counters of the two counterpart blocks and the levels of the intermediate samples stored in the two counterpart blocks.

15. The digital disc reader as defined in claim 13, wherein the post-processing means performs a validity check that includes a comparison between the value of the first temporal counter of one of the blocks and the value of the second temporal counter of the other of the blocks.

16. The digital disc reader as defined in claim 13,
wherein the two intermediate samples of each set are representative of a first transition appearing between the minimum and maximum samples of the set, and
each block further includes two additional storage elements for selectively storing a pair of additional intermediate samples representative of a final transition of the incident signal, the final transition being situated between the minimum and maximum samples.

17. The digital disc reader as defined in claim 16,
wherein each block further includes a fourth temporal counter that is associated with one of the additional intermediate samples, and
the post-processing means calculates the phase shift between the two incident signals using either the value of the third temporal counter associated with the pair of intermediate samples or the value of the fourth temporal counter associated with the pair of additional intermediate samples, based on the ratio between a difference between the values of the first temporal counters associated with the two counterpart blocks, and a difference between the values of the second temporal counters associated with the two counterpart blocks.

18. The digital disc reader as defined in claim 10,
wherein the post-processing means includes storage means,
when two block validation signals are delivered for two counterpart blocks of the two pairs, the checking means transfers contents of the two counterpart blocks into the storage means, and the post-processing means determines the phase shift based on contents of the storage means.

19. The digital disc reader as defined in claim 10, wherein the reader is a DVD disc reader.

20. A method for calculating mutual phase shift of first and second incident signals using a first pair of blocks associated with the first incident signal and a second pair of blocks associated with the second incident signal, each of the blocks storing a predetermined set of samples of the corresponding incident signal, said method comprising the steps of:

in the presence of minimum samples or maximum samples of both incident signals, storing a first set of samples relating to the first incident signal in one of the blocks of the first pair and a first set of samples relating to the second incident signal in the counterpart block of the second pair;

storing the following sets of samples of each incident signal alternately in the two blocks of each pair, beginning with the other block of each pair;

delivering a block validation signal when a set of samples has been completely stored in one of the blocks; and determining the phase shift of the first and second incident signals when two block validation signals are delivered for two counterpart blocks of the two pairs, wherein a minimum sample is less than a low threshold and a maximum sample is greater than a high threshold.

21. The method as defined in claim 20, further comprising the steps of:

detecting the minimum and maximum samples of each incident signal; and detecting transitions of each incident signal with respect to a predetermined overstepping threshold.

22. The method as defined in claim 20, wherein the predetermined set of samples includes at least one minimum sample, one maximum sample, and two intermediate samples that are representative of a transition of the incident signal with respect to a predetermined overstepping threshold, the transition being temporally situated between the minimum and maximum samples.

23. The method as defined in claim 20, further comprising the step of:

in the presence of minimum samples or maximum samples of both incident signals, initializing a temporal counter associated with the stored sample, wherein in the step of determining the phase shift, the phase shift of the first and second incident signals is determined based on at least the values of temporal counters of the two counterpart blocks and levels of the intermediate samples stored in the two counterpart blocks.

* * * * *